Patented Sept. 3, 1946

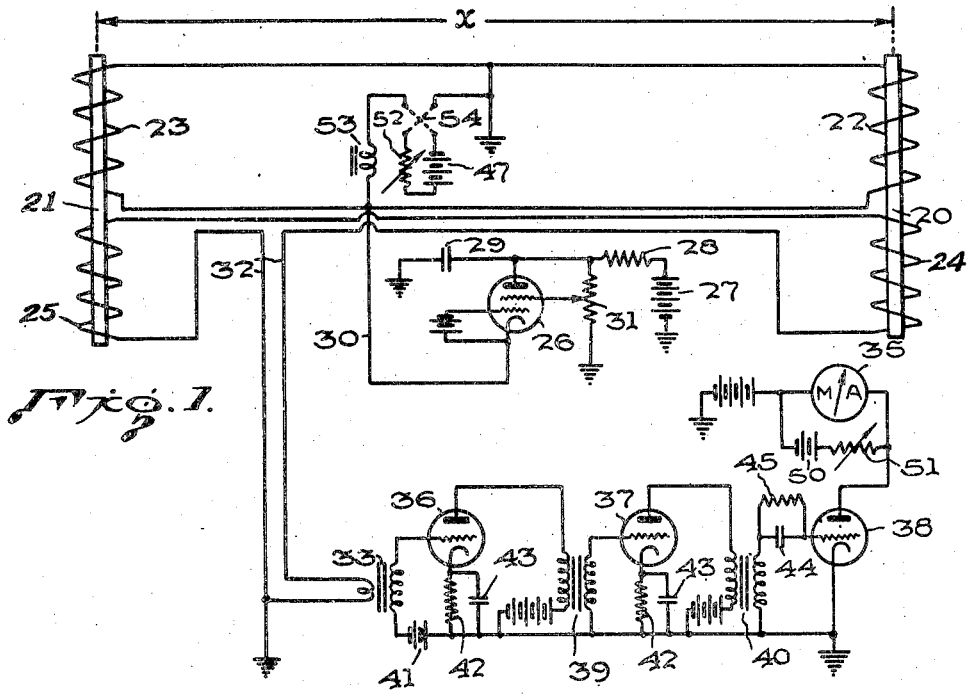

2,407,202

UNITED STATES PATENT OFFICE 2,407,202

APPARATUS FOR RESPONDING TO MAGNETIC FIELDS

Victor V. Vacquier, Garden City, N. Y., assignor to Gulf Research & Development Company, Pittsburgh, Pa., a corporation of Delaware Original application July 21, 1941, Serial No. 403,455. Divided and this application July 17, 1945, Serial No. 605,550

6 Claims. (Cl. 177—380)

This invention relates to improvements in apparatus for responding to magnetic fields and in particular it concerns improved apparatus which responds to and measures the space gradient of a magnetic field.

The instant application is a division of my copending application, Ser. No. 403,455, filed July 21, 1941, entitled Apparatus for responding to magnetic fields.

In many arts it is desired to produce an electrical signal or impulse in accordance with relatively small changes in magnetic fields. For example, in detecting submarines from ships or airplanes, a device is desired which will produce a usable electric signal on the rather small change in local magnetic field due to the relatively distant iron mass of the submarine, and a similar need arises in military mines intended to set off explosives on approach of a vehicle or ship within a predetermined distance. In automatic ship or aircraft piloting apparatus it is desired to provide a device responsive to the earth's magnetic field and capable of producing an electric signal on a small deviation from some predetermined direction in such field. Similar problems arise in magnetometry, involving investigation of the magnetic fields of metallic or non-metallic specimens, or of the earth's field as in prospecting work. In measurements of magnetic gradient an instrument sensitive to differences of magnetic field is required.

Magnetic field responsive apparatus of various types have been proposed. Most apparatus heretofore known has suffered from a lack of sufficient magnetic sensitivity, or has been unduly sensitive to mechanical shocks and vibrations, or is dependent, as regards its output, on acceleration.

One magnetically responsive system of the prior art, which is promising on its face but is rather disappointing in results, makes use of a pair of matched transformers having cores of high-permeability material, the primaries of which are arranged for periodic energization and the secondaries of which are connected in opposed relation to each other and are connected to a transducing device of a type which responds to any and all electrical signals applied to it. With such a circuit, in the absence of an ambient magnetic field, the voltages induced in the secondaries are equal and opposite and no signal appears. In the presence of a magnetic field, in each magnetization cycle of the transformers, the field and flux developed in one of the cores is increased by a certain amount and that in the other core reduced by the same amount, so that energy appears in the output circuit. Such a system properly modified has been used to measure magnetic gradient, but this apparatus is in practice seriously lacking in sensitivity.

Among the objects achieved in this invention are the provision of an apparatus adapted to respond to the gradient of a magnetic field, characterized by an extraordinarily high sensitivity, which, however, is accompanied by reliability and insensitivity to mechanical shocks and vibrations; the provision of such an apparatus the output of which is independent of acceleration; the provision of such a device adapted for accurate quantitative measurement of magnetic field gradient; and the provision of such an apparatus involving use of magnetically susceptible transformer cores in which error due to residual magnetism in the cores is avoided.

The present invention makes special application of the knowledge that a core of material of high permeability and low energy requirement for saturation (Hypernik, Mu-metal or Permalloy, for example) exhibits a hysteresis loop of peculiar form, and upon the discovery that the unique flux-field relation can be taken advantage of, by suitable expedients, to afford a magnetically responsive circuit of extraordinary sensitivity; a sensitivity of the order of 10 to 100 times that attainable with the most highly perfected apparatus of the prior art known to me.

In detail, oscillographic studies show that on periodically magnetically energizing a small, thin core of high permeability alloy, to saturation, the hysteresis loop exhibits a sharp knee at the saturation point. The magnetic flux changes very rapidly with applied field and then suddenly becomes constant at saturation.

In my invention, in its best embodiment, two cores are provided, of minimal cross-sectional area (for reasons explained below), carrying windings energized by a periodic current source of sufficient amplitude to energize the cores periodically beyond saturation, and other windings carefully balanced on each core for taking off an induced voltage. By virtue of the described break in the hysteresis loop, the voltage induced in each output winding is a wave of extremely distorted shape, which rises more or less gradually and then drops suddenly to a low value or zero, at instants in time corresponding to the arrival, in each core, of the flux at said knee in the hysteresis loop. The output windings are connected in opposition, the cores and their windings being balanced, so that in the absence of any space variation of the applied magnetic field the net output is zero. Now, if the ambient magnetic field is different at the locations occupied by the two cores, the field and flux developed in one core during each energization cycle is correspondingly different from that in the other. The pulse in one secondary terminates abruptly, and slightly before the pulse in the other secondary terminates. By virtue of the opposed connection of the secondaries this phase shift gives rise to a very sharp voltage pulse in the output circuit, i. e. a pulse of short duration but high intensity. The amount of energy in the pulse depends upon the degree of phase shift and in turn on the gradient of the applied field.

To take advantage of this pulse (which while non-oscillatory per se can be considered as a summation of vibratory components of high frequencies) and to distinguish it from other energy pulses or waves (of origin explained in my copending application Ser. No. 403,455), the amplifier or other transducing device is made to be selective to sharp pulses, by biasing it so that applied potentials below a predetermined value do not affect it, and by careful selection of the several circuit constants as described in detail below.

While the transformer primaries can be energized with almost any kind of periodically varying voltage, including pure sinusoidal alternating energy, there are advantages in employing a saw-tooth wave or pulse series for the periodically applied energy. These considerations are described in detail in my aforementioned copending application.

The manner in which the apparatus of my invention accomplishes its objects will become apparent in the following specification of which the accompanying drawing forms a part. In the drawing, Fig. 1 is a circuit diagram of one embodiment of the invention, and Fig. 2 is another embodiment of the invention employing a simplified electrical circuit.

Referring to the drawing and in particular Fig. 1, a spatially separated pair of parallel transformer cores, 20 and 21, is provided, these cores taking the form of very thin strips or ribbons of a magnetic material which has a high permeability and a low energy requirement for saturation. Among suitable materials for the cores are the alloys known as Hypernik, Mu-metal and Permalloy. Absolute and relative dimensions of the cores are important, as explained, and for highest sensitivity, the cores and their windings should be very carefully matched.

The cores are provided with similarly-wound primary windings 22 and 23, and similarly-wound secondary windings 24 and 25. The primaries are connected in parallel as shown and are periodically energized by an oscillator making use of a hot cathode gas triode 26, in circuit with a battery 27, resistor 28 and condenser 29, to supply energy pulses through a connection 30 to the primaries. Screen voltage is secured by a voltage divider 31 across the plate circuit, by means of which amplitude and frequency of the oscillations can be adjusted.

The secondaries are connected to each other in series opposition through a circuit including leads 32 and the primary of a step-up transformer 33, as shown, at the input of an amplifier, described in detail below, constructed and arranged to be selective to the high frequency pulses appearing at the transformer.

The theory underlying the operation of my apparatus has been described in detail in my copending application Ser. No. 403,455 for purposes of measuring magnetic field strength rather than gradient of magnetic field. For the former purpose parallel cores 20 and 21 are placed in close proximity to each other, primary windings 22 and 23 are oppositely wound with respect to each other, and secondary windings 24 and 25 are also oppositely wound with respect to each other.

The present invention, being a division of the aforesaid application, contemplates measurement of the space gradient of the magnetic field. For this purpose cores 20 and 21 are still maintained parallel, but spatially separated by a known distance X so as to detect such gradient of magnetic intensity. Primary windings 22 and 23 are now similarly-wound with respect to each other, and secondary windings 24 and 25 are also similarly-wound with respect to each other and connected in series opposition. If now the component of the magnetic field parallel to the length of cores 20 and 21 has a gradient in the spatial direction X of separation of cores 20 and 21, each core will experience a different degree of magnetization due to the difference in the ambient field at the two cores, and there will be different signals induced in the secondary windings. These signals will be qualitatively similar in shape, but one will lead the other slightly in time; that is, there will be a phase shift or displacement between the signals from the two secondaries. As these voltage signals are opposed, the net signal is obtained by subtracting one wave form from the other. This manner of operation is similar to that described in more detail in my copending application Ser. No. 403,455 previously referred to. The unbalanced pulses in the secondary circuit are fed by leads 32 into the primary of step-up transformer 33 and are subsequently amplified and finally exhibited by unit 35.

The signal in leads 32 has for each energizing cycle a very high peak and a number of smaller peaks. These sharp peaks change in amplitude very rapidly as the ambient field is changed. Due to the very steep wave front of the magnetizing pulses, the core material is magnetized in a very small part of one cycle so that the angular phase shifts produced by the ambient field are very small, and by reason of the abrupt change at saturation the differential E. M. F. appearing at the output of circuit is a very sharp pulse of short duration. Accordingly, the secondary windings are designed to have a sufficiently low distributed capacity to permit the very high frequency components to appear at the terminals. Likewise, associated amplifier equipment is designed to handle the essentially unidirectional, high frequency pulse appearing at the output terminals.

Since the voltage induced in the secondaries is dependent upon the rate of change of magnetic flux, the more rapidly the magnetization cycle is traversed the higher will be the output voltage for a given ambient field. However, due to the effects of distributed capacity and time-constant limitations in associated amplifier equipment the optimum rate at which the magnetization cycle should be traversed is a compromise between these opposing effects. Rates of 60 to 1000 cycles are the most useful.

Considering now the amplifier circuit of Fig. 1, which as stated is devised to accentuate the sharp pulses produced as described: the amplifier, the output of which is delivered to an exhibiting device 35, includes two amplifier stages 36 and 37 and a vacuum tube rectifier 38, arranged in a circuit, the constants of which are selected to emphasize high frequencies and rapid fluctuations. Thus, input transformer 33 and interstage transformers 39 and 40 are of a low inductance type capable of passing frequencies of 20,000 cycles or more. Certain small audio-frequency transformers are available for this purpose. A bias battery 41, self-biasing resistors 42 of abnormally high values and bypass condensers 43 of low values are provided, in circuit as shown, so that the tubes are biased nearly to their cut-off points and only positive pulses operate the tubes. Such circuit degenerates low frequencies, and the net result is a high degree of discrimination against pulses of low amplitude, pulses of low frequency and pulses of undesired polarity. The transformers are all phased to make the highly sensitive sharp pulses received through leads 32 result in positive pulses at the grids of the three tubes. Transformer 33 advantageously has a high step-up ratio. By having its primary inductance low, it favors the more rapid changes of the signal and tends to short circuit the slow changes.

Tube 38 is a rectifier of the grid leak type. Each pulse peak drives its grid momentarily positive, causing a grid current to flow. This current charges the condenser 44 to a voltage nearly equal to the peak value. Resistor 45 is large enough so that condenser 44 is but partially discharged between peaks. Hence the grid remains negative over most of the cycle by an amount varying with the strength of the signal. The plate current as exhibited at meter 35 thus decreases from its normal maximum value in proportion to the signal strength. A buck-out battery 50 and adjustable resistor 51 may be used with a sensitive meter if high sensitivity is desired.

In the operation of Fig. 1, for making measurements of the space gradient of a magnetic field, the two wound cores 20 and 21 are first placed near to each other so that X is essentially zero and meter 35 is set to zero by adjusting variable resistor 51. The wound cores 20 and 21 are then separated a known distance X in the direction of the gradient to be determined and oriented so that their long dimension is in the direction of the field component whose gradient is to be determined. If such a gradient exists, meter 35 will no longer read zero, and its reading may be calibrated in terms of field strength difference over the known distance X. Because of the aforementioned manner of operation of rectifier 38, only response in one sense may have adequate sensitivity; should meter 35 become relatively insensitive, it may be desirable to reverse the polarity of the pulses in transformer 33 by reversing the primary connections 32 or by changing the relative output of the detector coils with biasing magnets or the equivalent. In some cases, reversing the positions of units 20 and 21 may be all that is necessary.

The sensitivity to gradient may be increased in cases of relatively high ambient fields by the application of a compensating current to the primary coils. Thus, in the initial adjustment of the device as above described, switch 54 may be closed in the proper direction so that a current from battery 47 may flow through the coils 22 and 23 to compensate for the greater part of the ambient field, the amount of such compensating current being controlled by adjustable resistance 52. A high frequency choke 53 is maintained in the battery circuit in order to keep signals from the energizing oscillator 26 out of the battery circuit. Current from the battery circuit magnetizes both cores in the same direction, ordinarily that direction which opposes the ambient field.

Fig. 2 shows a simplified embodiment of the invention. The two cores 20 and 21 with their respective primaries 22 and 23 are periodically energized by a circuit comprising a battery 27, a resistor 28 and a condenser 29, connected to a gas-filled cold cathode tube 226 in circuit with primaries 22 and 23 as shown. The battery charges the condenser and when the charge reaches a certain potential the tube breaks down and discharges a pulse of current through the primaries. Pulses occur at regular intervals, determined by the battery voltage, the values selected for the elements 28 and 29, and the breakdown voltage of tube 226. The sensitivity of the apparatus is not affected by the rate of impulse generation. A hot cathode tube may be substituted for the tube 226 if desired.

The direction of winding and connection of the primary coils 22 and 23 is such that the right hand end of each core 20 and 21 is energized with the same polarity. Secondary coils 24 and 25 are wound and connected so that their induced pulse voltages are opposed when there is no field gradient in the direction X. The secondaries 24 and 25 are connected to primary of transformer 33 whose secondary 46 is connected to a vacuum tube voltmeter indicated generally by 88 and which may include one or more stages of amplification. Thus, when wound cores 20 and 21 are placed in near proximity to each other so that their separation X is practically zero, no indication is obtained on meter 88. When the wound cores 20 and 21 are separated a distance X, the meter 88 will exhibit a deflection proportional to the appropriate magnetic gradient.

Each of the wound cores 20 and 21 may be enclosed by a concentric solenoid or coil 83. This coil may be connected in a simple series circuit, together with reversing switch 85, variable resistor 86, meter 87 and battery 84. Solenoid 83 may be energized so as to oppose the greater part of the ambient field thereby making the device more sensitive to the gradient of such field.

I have illustrated in Figures 1 and 2 my device set up to measure two types of partial gradients, but the apparatus may be used for determining any type of space gradient according to the geometrical arrangement of cores 20 and 21 with respect to the direction X. Thus, in Figure 1 the component of magnetic field being observed is shown normal to the direction of separation X, this arrangement may measure the quantities $$\frac{\delta H_y}{\delta x}$$

or $$\frac{\delta H_z}{\delta x}$$

where $H_y$ and $H_z$ are respectively the components of the total field H in the $y$ and $z$ directions respectively. In Figure 2 the component of magnetic field being observed is shown parallel to the direction of separation X, this arrangement will measure the quantity $$\frac{\delta H_x}{\delta x}$$

where $H_x$ is the component of the total field in the X direction. Similarly, by appropriately orienting the wound cores other partial or total components of the gradient may be measured. The cores may also be placed at an angle to each other in order to measure angular components of gradient in cylindrical or other coordinate systems used to describe the field.

In all embodiments of the invention, the apparatus sensitivity is very high, yet is accomplished by a high degree of inertness to mechanical shocks and disturbances. Except where deliberately provided for otherwise, the predetermined intensity level at which it gives a signal is independent of acceleration, that is to say the rate of change of speed at which the apparatus approaches, or is approached by, the foreign magnetic body. This makes possible fine measurements of magnetic intensity and gradient from a moving conveyance as a destroyer or airplane.

What I claim is:

1. An apparatus responsive to space gradient of magnetic field comprising a pair of slender cores of minimal cross-sectional area and of material of high permeability and characterized in that the hysteresis loop thereof exhibits a sharp knee where saturation is reached, said cores arranged parallel to each other and with a spacing between them such that the gradient may establish a difference in field at their respective locations, means for cyclically energizing said cores to saturation in the same sense whereby each core abruptly reaches saturation at a phase of the energizing cycle which is shifted by changes in the ambient field at said core, windings adjacent said cores connected in opposition to deliver the differences between voltages induced by said cores, whereby said phase shifts cause production of sharp voltage pulses which vary in magnitude with a change in field at either one of the cores, and transducing means selective to said pulses in energy-receiving relation to said windings.

2. An apparatus responsive to space gradient of magnetic field comprising a pair of parallel cores spatially separated a distance such that the gradient may establish a difference in field at their respective locations and of material of high permeability and characterized in that the hysteresis loop thereof exhibits a sharp knee where saturation is reached, similarly phased primary windings on the cores, means connected to said primary windings for periodically energizing said cores to saturation in the same sense whereby each core abruptly attains saturation at a phase of the energizing cycle which is shifted by changes in the ambient field at said core, secondary windings on the cores connected in opposition to deliver the difference between the voltages induced by said cores, whereby said phase shifts cause production of sharp voltage pulses which vary in magnitude with difference in field between said spatially separated cores, and amplifying means arranged to receive said sharp voltage pulses and to amplify them selectively while discriminating against low amplitude voltage pulsations.

3. An apparatus responsive to space gradient of magnetic field comprising a pair of slender cores of minimal cross-sectional area spatially separated a distance such that the gradient may establish a difference in field at their respective locations and of material of high permeability and characterized in that the hysteresis loop thereof exhibits a sharp knee where saturation is reached, means for cyclically energizing said cores to saturation in the same sense whereby each core abruptly reaches saturation at a phase of the energizing cycle which is shifted by changes in the ambient field at said core, windings adjacent said cores connected in opposition to deliver the difference between voltages induced by said cores, whereby said phase shifts cause production of sharp voltage pulses which vary in magnitude with a change in field at either one of the cores, and transducing means selective to said pulses in energy-receiving relation to said windings, and means for subjecting the cores to a field approximately equal and opposite to the ambient field.

4. An apparatus responsive to space gradient of magnetic field comprising a pair of slender cores separated a distance such that the gradient may establish a difference in field at their respective locations, said cores being of high permeability material not exceeding approximately 0.02 inch in thickness and characterized in that the hysteresis loop thereof exhibits a sharp knee where saturation is reached, windings by which the cores may be energized to saturation in the same sense, means for cyclically energizing said windings in a manner whereby the cores abruptly reach saturation at phases of the energizing cycle which are shifted by changes in the ambient field at said cores, a secondary circuit having means therein linked with said cores to deliver the difference between the voltages induced by said cores, whereby said phase shifts cause production of sharp voltage pulses which vary in magnitude with a change in field at either of the cores, and transducing means selective to said pulses in energy-receiving relationship to said secondary circuit.

5. An apparatus responsive to space gradient of magnetic field comprising a pair of cores spatially separated a distance such that the gradient may establish a difference in field at their respective locations and of material of high permeability and characterized in that the hysteresis loop thereof exhibits a sharp knee where saturation is reached, means for cyclically energizing said cores to saturation in the same sense in a manner whereby each core reaches saturation at a phase of the energizing cycle which is shifted by changes in the ambient field at said core, a secondary circuit having means therein linked with said cores to deliver the difference between the voltages induced in said means by said cores, whereby said phase shifts cause production of sharp voltage pulses which vary in magnitude with a change in field at either of the cores, and amplifier means in energy-receiving relation to said means biased to a level such as to respond to said sharp pulses while not responding to relatively low voltage fluctuations.

6. An apparatus responsive to space gradient of magnetic field comprising cores of material of high permeability and characterized in that the hysteresis loop thereof exhibits a sharp knee where saturation is reached, said cores being spatially separated a distance such that the gradient may establish a difference in field at their respective locations, means for cyclically energizing said cores to saturation in the same sense in a manner whereby each core reaches saturation at a phase of the energizing cycle which is shifted by changes in its ambient field, a secondary circuit having means therein linked with said cores to deliver the difference between the voltages induced in said means by said cores and transducing means in energy-receiving relationship to said secondary circuit.

VICTOR V. VACQUIER.